May 17, 1932.  K. D. CHAMBERS  1,858,702

APPARATUS FOR AND METHOD OF LIGHTING AUTOMOTIVE VEHICLES

Original Filed Feb. 9, 1928  2 Sheets-Sheet 1

Inventor
Karl D. Chambers
By his Attorneys
Prindle, Wright, Neal & Bean

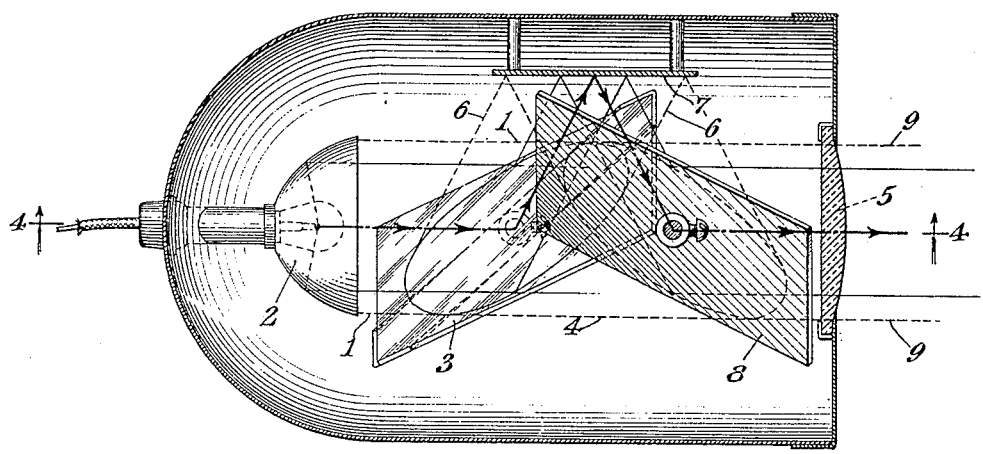
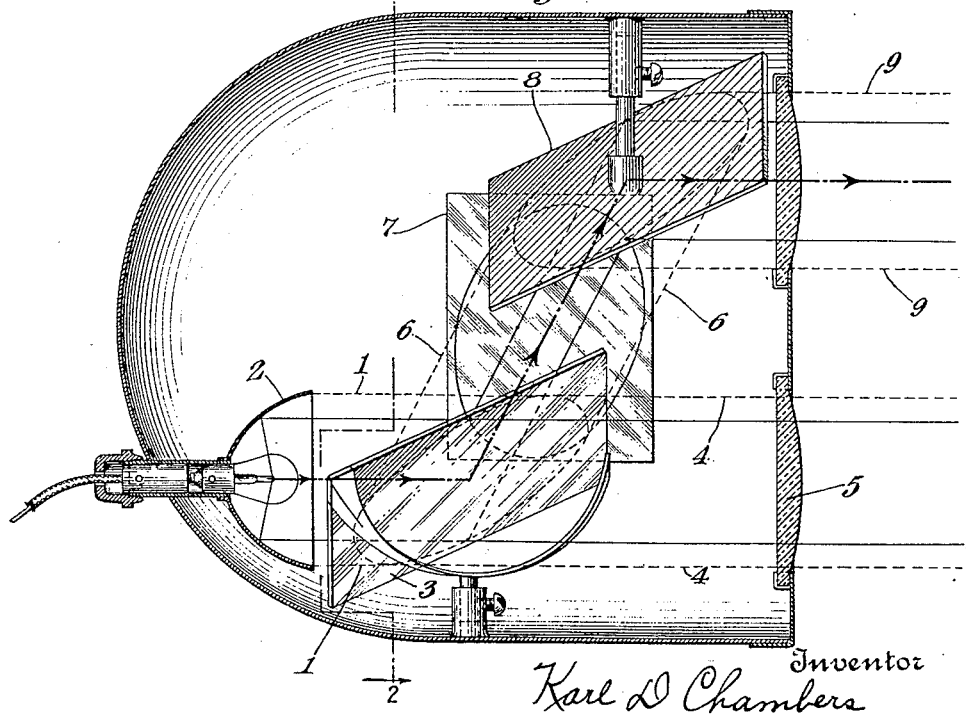

Patented May 17, 1932

1,858,702

UNITED STATES PATENT OFFICE

KARL D. CHAMBERS, OF MONTGOMERY, ALABAMA

APPARATUS FOR AND METHOD OF LIGHTING AUTOMOTIVE VEHICLES

Application filed February 9, 1928, Serial No. 252,985. Renewed September 12, 1931.

The object of my invention has been to provide a means for and a method of lighting automotive vehicles with light polarized in a determined plane so that the driver of each vehicle may adequately see an approaching vehicle and the roadway or neighboring objects without being blinded by the light of such vehicle. According to my invention each vehicle will be able to throw a beam or rather beams of light from its headlights and these beams which are thrown forward in the direction in which the vehicle is intended to travel, will all be composed almost entirely of plane polarized light beams with their planes of polarization parallel to a determined plane. By suitable analyzers which are not part of this patent application, the drivers will be protected from this polarized light. By causing a beam of practically collimated light to be reflected and refracted by a pile of parallel plane glass plates and by twice reflecting the beam reflected by these glass plates with mirrors, both the refracted and the reflected beams are thrown out from the headlight practically parallel and almost entirely composed of plane polarized light with parallel planes of polarization. This is a very efficient and economical way of achieving this result and enables very much over fifty (50%) per cent, of the light of the collimated beam to be used effectively and in plane polarized form.

While I have chosen as an illustration of my invention these embodiments thereof which are the best ones known to me, my invention is capable of embodiment in many different forms, and the illustrated forms are, therefore, only typical and my invention is not to be confined thereto.

In the accompanying drawings, Figure 1 is a side perspective drawing showing a headlamp from the left side and from a point somewhat in front. The left side has been cut away to show the location of all the elements with the exception of the side mirror which has been removed with the left side.

Figure 3 is a top elevation showing the light source, the pile of plane and parallel glass plates, the perpendicular mirror, the top mirror, and the relative position of the lenses.

Figure 4 is a right side elevation showing the relations of all elements.

Figure 1:
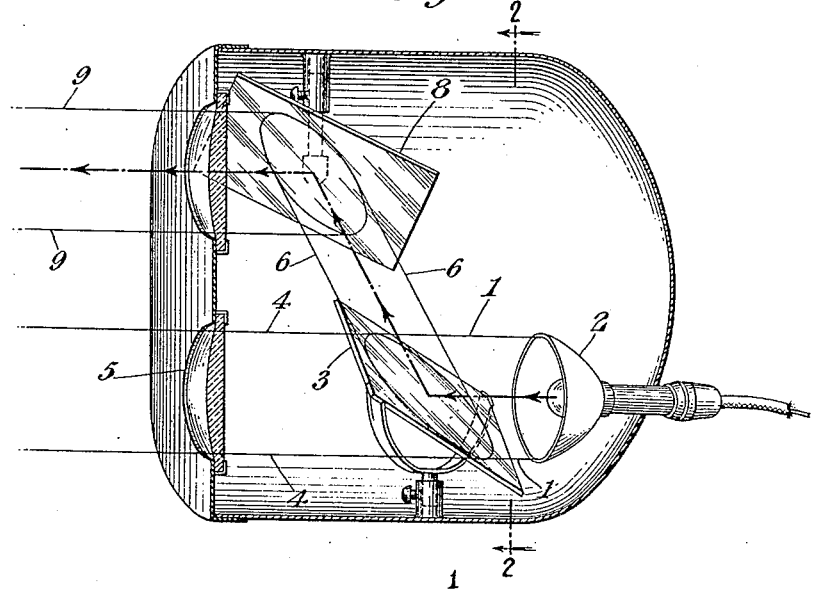
Figure 2:
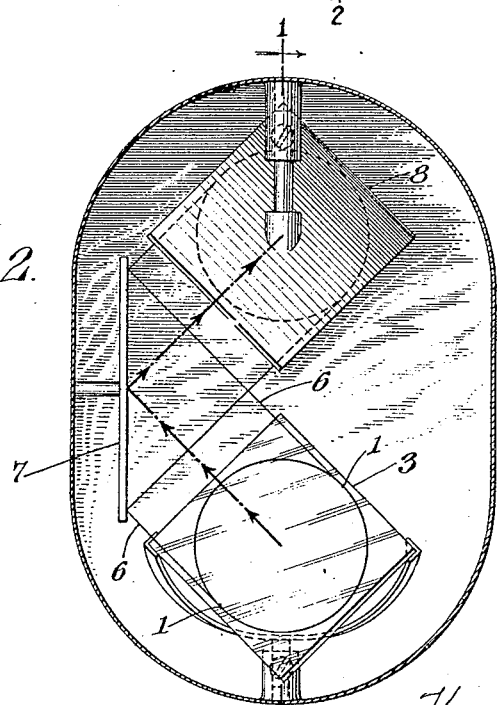
Figure 2 is a back elevation of the headlamp showing the relative position of the bottom pile of plane and parallel glass plates, the perpendicular mirror and the top mirror.

As a particular illustration of my invention:—A beam of collimated light 1 from a reflector 2 is thrown on a pile of parallel plane glass plates 3. The refracted beam 4 is passed through a lens 5 of suitable distribution characteristics and thence allowed to pass out to the objects to be illuminated. This beam is plane polarized and its plane of polarization is 45° up to the right and 45° down to the left and includes the horizontal axis of its beam. This "up to the right" means as one stands beside the lamp looking in the direction the beam is being thrown.

The beam 6 reflected by the glass plates 3 is reflected by a perpendicular mirror 7 fixed to the left side of the lamp and slightly forward of the pile of glass plates and then is again reflected by another mirror 8 above and still further forward of the pile of glass plates.

These mirrors are so placed and interrelated that the beam 9 as reflected from the second mirror is parallel to the beam 4 refracted by the pile of glass plates and is plane polarized in a plane parallel to the plane of polarization of that beam. This upper beam is then passed through a lens with suitable distribution characteristics and so onto the objects to be illuminated.

I wish to state that the parallel, specularly reflecting, plates of highly transparent medium do not have to be glass.

The following brief and simplified description is given for the purpose of explaining the principles of my invention, referring to the accompanying figures. A collimated beam of light is thrown from a light source such as the parabolic reflector 2 upon the pile of glass plates 3. This pile of glass plates breaks up the collimated beam into two polarized beams, one refracted and the other reflected, each polarized in a plane at right angles to the other.

The reflected beam 6 is reflected upon a mirror 7, which turns the plane of polarization 90° so as to make the plane of polarization of this beam now the same as the plane of polarization of the refracted beam 4 of the pile of plates. This is the major object of the invention, that is, to get both beams polarized in the same plane. However, since beam 6 is going in an undesirable direction it is reflected by mirror 8 so that it is turned in the desired direction without changing its plane of polarization.

To effect these results, the tangent of the angle of incidence on the first object, the pile of glass plates, must be equal to the index of refraction of the glass or its equivalent material used in the pile of glass plates.

I claim:—

1. The method of lighting motor vehicles comprising projecting plane polarized light from such a vehicle, which comprises dividing a collimated light beam into two beams, polarizing each of said beams in a different plane, said planes being at an angle to each other and rotating said planes relative to each other, so as to place them in parallelism.

2. A method of lighting motor vehicles by projecting plane polarized light from such a vehicle, which comprises dividing a collimated light beam into two beams, by placing a polarizing medium in such position that part of the light will be refracted therethrough and part reflected therefrom, and rotating one of the planes of polarization so as to bring the planes of polarization of said beams into parallelism with each other.

3. The method of obtaining plane polarized light comprising reflecting and refracting a beam of light with a pile of parallel, specularly reflecting plates of transparent medium and then so reflecting one or both of the resultant plane polarized beams as to cause both beams to emerge with their planes of polarization parallel.

4. The method of obtaining polarized light, from a collimated beam, in the form of almost entirely plane polarized light comprising reflecting and refracting the collimated beam into two beams almost entirely plane polarized and subsequently reflecting one or both of these beams so as to make planes of polarization parallel.

5. The method of headlighting automotive vehicles comprising utilizing the ability of a pile of parallel, specularly reflecting, plates of transparent medium to break up a beam of nearly collimated light into two beams of nearly plane polarized light with their planes perpendicular and subsequently reflecting one or both of these beams so as to cause their planes of polarization to become parallel.

6. The method of obtaining more than 50% of a beam of collimated light in polarized form in parallel planes comprising reflecting and refracting such beam with a pile of parallel specularly reflecting plates of transparent medium and rotating one or both of the resultant plane polarized beams by reflection to cause both beams to emerge with their planes of polarization parallel.

7. An apparatus for projecting polarized light comprising a light source, a parabolic reflector adapted to collimate a majority of the beams therefrom, a specularly reflecting polarization pile positioned in front of said reflector adapted in part to reflect and in part to refract the collimated beams, and mirrors so positioned as to change the planes and directions of said reflected beams so that these beams are in planes substantially parallel to the refracted beams and are projected in similar direction thereto.

8. An apparatus for projecting polarized light comprising a light source, a parabolic reflector adapted to collimate a majority of the beams therefrom, a specularly reflecting polarization pile positioned in front of said reflector adapted in part to reflect and in part to refract the collimated beams, a mirror positioned to catch the beams from the reflecting pile and adapted to tilt and to change the planes of said beams so that they may be reflected in planes parallel to the refracted beams and a second mirror adapted to reflect the tilted beams so that said beams are transmitted substantially in the same direction as the refracted beams.

9. An apparatus for projecting polarized light comprising a light source, a collimating reflector therefore, a specularly reflecting polarizer positioned in front of said reflector and adapted to refract a portion of the light beams and reflect substantially the remainder, and means adapted to change the planes and directions of the reflected light beams so that said beams are substantially parallel and directionally similar to the refracted beams.

10. The method of breaking a collimated light beam into two beams and projecting more than 50% of said beams in substantially parallel planes of polarized light, which comprises throwing said collimated beam upon a reflecting polarization pile so that a polarized refractive beam and a polarized reflective beam are obtained simultaneously and thereafter bending and reflecting said polarized reflective beam into a plane which is substantially parallel to said refractive beam.

In testimony that I claim the foregoing, I have hereunto set my hand this 6th day of February, 1928.

KARL D. CHAMBERS.